United States Patent [19]
Abernathy et al.

[11] 3,951,366
[45] Apr. 20, 1976

[54] HANGER

[76] Inventors: William J. Abernathy, 209 Cole Drive, Huntsville, Ala. 35802; Lowell G. Snoddy, 419 Warner St., NW., Huntsville, Ala. 35805

[22] Filed: Dec. 23, 1974

[21] Appl. No.: 535,409

[52] U.S. Cl................................ 248/15; 248/204; 248/358 R; 308/2 A
[51] Int. Cl.².......................................... F16F 15/00
[58] Field of Search................................... 248/6–9, 248/14, 15, 17, 18, 19, 20, 22, 26, 358 R, 204; 267/165; 308/2 A; 64/15 R, 15 B, 27 R, 27 B

[56] References Cited
UNITED STATES PATENTS

| | | | |
|---|---|---|---|
| 1,557,958 | 10/1925 | Anderson | 64/15 B |
| 2,063,216 | 12/1936 | Zaparka | 248/14 X |
| 2,591,769 | 4/1952 | Beechler | 64/15 B |
| 2,702,703 | 2/1955 | Franceschetti | 248/358 R X |
| 2,729,443 | 1/1956 | Olinger | 248/22 X |
| 3,103,348 | 9/1963 | Paulson | 248/358 R X |
| 3,162,723 | 12/1964 | McCurtain | 248/26 UX |
| 3,307,810 | 3/1967 | Lichowsky | 248/204 X |
| 3,856,249 | 12/1974 | Frye | 248/205 A |

FOREIGN PATENTS OR APPLICATIONS

| | | | |
|---|---|---|---|
| 861,600 | 2/1961 | United Kingdom | 64/15 B |

Primary Examiner—Roy D. Frazier
Assistant Examiner—Lawrence J. Staab
Attorney, Agent, or Firm—Wayland H. Riggins; L. D. Wofford, Jr.; John R. Manning

[57] ABSTRACT

An improved hanger for resiliently supporting delicate instrumentation charactrized by an elongated elastic body, having omnidirectional rigidity, adapted to be supported at each of its opposite ends and connected in supporting relation with a mounting block disposed midway between the opposite ends thereof. The body includes a plurality of mutually spaced flexure plates disposed in substantially parallel planes and interconnected through a plurality of abaxially aligned flexure pins spaced in sequential helical progression about a common axis normally related to said planes for serially interconnecting the plates for imparting a predetermined coefficient of elasticity to the body.

1 Claim, 4 Drawing Figures

HANGER

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates to hangers for supporting delicate instrumentation and more particularly to an improved hanger having omnidirectional rigidity for supporting a gyro motor.

As can readily be appreciated by those familiar with various fields of technology wherein delicate instrumentation, such as gyro motors and the like, are supported by elastic structure which accommodates motion, a great deal of difficulty is encountered in achieving uniformity in directional rigidity, relied upon in uniformly resisting the motion, in order to protect the instrumentation from deleterious effects of motion. This is of particular concern to those in the aerospace industry engaged in the design, fabrication, and installation of delicate instrumentation, such as gyro motors, aboard spacecraft which often requires a use of economic, lightweight, and reliable hangers of a simplified and practical design.

Hangers heretofore employed in the installation of gyro motors frequently are characterized by directional rigidity which results in excessive motion in given directions being accommodated, while insufficient motion in other directions is afforded the mountings employed in supporting the motors. Such lack of uniformity in rigidity often results in the damaging of the bearings employed in supporting the momentum wheels of gyro motors, particularly when these motors are subjected to the G-loading and vibrations which often attend the launching of spacecraft. Such damage can, of course, lead to aborted missions.

It is, therefore, a general purpose of the instant invention to provide an improved and lightweight hanger, of a simplified design, having enhanced uniformity in motion resisting rigidity for mounting delicate instrumentation, such as gyro motors and the like.

OBJECTS AND SUMMARY OF THE INVENTION

It is an object of the instant invention to provide an improved hanger which overcomes the aforementioned difficulties and disadvantages.

It is another object to provide an improved hanger for use in resiliently supporting movable mounting blocks with a high degree of uniformity in rigidity.

It is another object to provide an improved, lightweight, economic hanger of a simplified design for use in supporting a gyro motor against motion in at least four directions with mutually equal force, while supporting the motor against motion in two other directions with forces equal to each other.

It is another object to provide an improved, lightweight, economic hanger of a simplified design for mounting instrumentation aboard spacecraft and the like which resists motion in four directions with forces of a first common magnitude, while resisting motion in two other directions with forces of a second common magnitude.

These and other objects and advantages are achieved through the use of a hanger which includes an elongated, elastic body adapted to be supported at each of its opposite ends and connected, near its midportion, in supporting relation with a selected mounting block for a gyro motor, including a plurality of mutually spaced flexure plates disposed in substantially parallel planes, and a series of abaxially aligned flexure pins spaced in sequential helical progression about a common axis normally related to the pins for serially interconnecting the flexure plates.

DESCRIPTION OF THE PREFERRED EMBODIMENT

Figure 1:
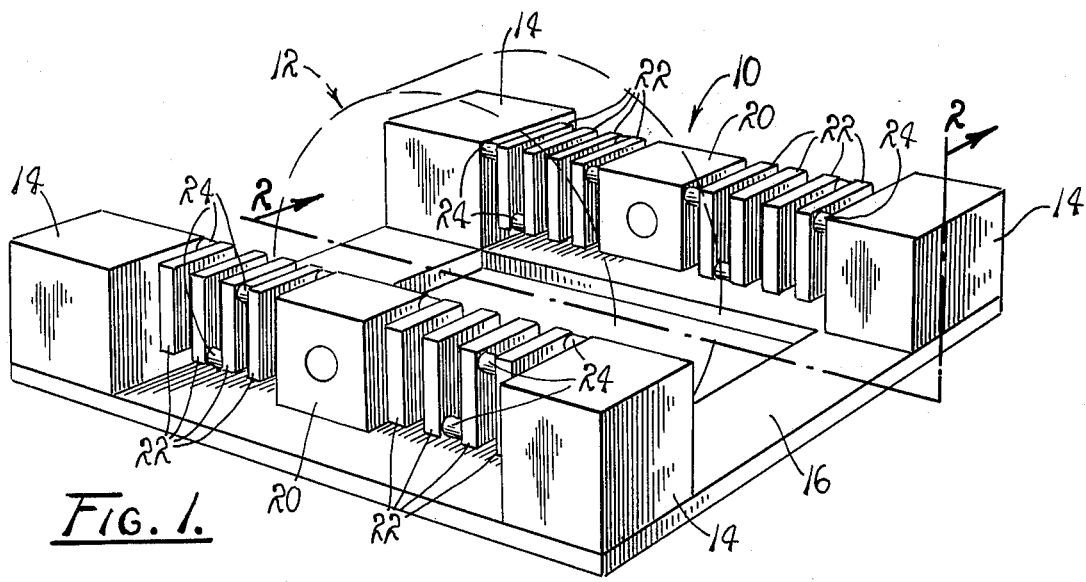
FIG. 1 is a perspective view of a pair of improved hangers, each of which embodies the principles of the instant invention, disposed in substantially mutually spaced parallelism for receiving therebetween a gyro motor.

Referring now, with more particularity, to the drawings wherein like reference characters designate like or corresponding parts throughout the several views, there is shown in FIG. 1 a pair of hangers, each being designated 10, which embody the principles of the instant invention.

As shown in phantom, the hangers 10 have disposed therebetween a gyro motor, generally designated 12. It will, of course, be appreciated that while the hangers 10 are particularly suited for use in a paired relationship, for mounting gyro motors, each of the hangers can be separately employed for supporting instrumentation and similar bodies without departing from the spirit of the invention.

Since the hangers 10 are of similar design and construction and are employable in a similar manner for achieving similar results, a detailed description of a single one of the hangers 10 is believed sufficient for providing a complete understanding of the instant invention.

Figure 2:
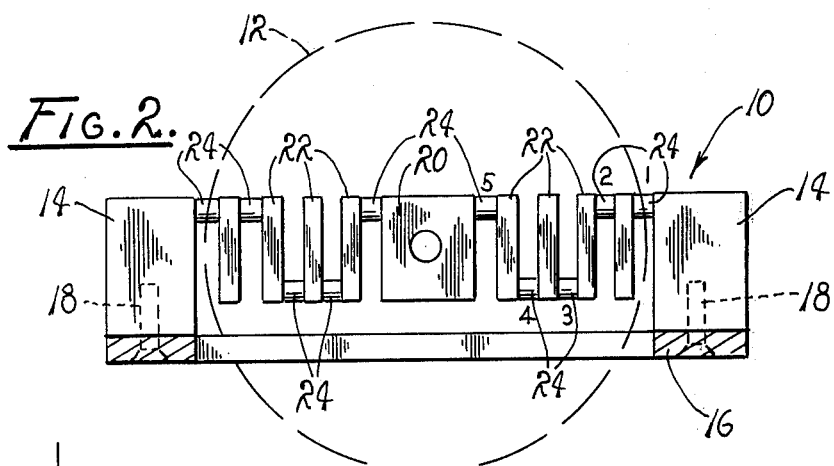
FIG. 2 is a side elevation of one of the hangers shown in FIG. 1, depicting a plurality of flexure plates disposed between a pair of spaced piers and interconnected by a plurality of abaxially aligned flexure pins.
Figure 3:
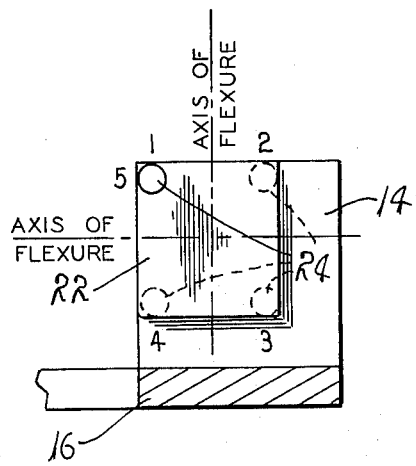
FIG. 3 is a diagrammatic view of one of the flexure plates shown in FIG. 1 depicting axes of flexure for the flexure plates.

As illustrated in FIG. 2, the hanger 10 is of an elongated configuration and is supported at each of its opposite ends by a pier, designated 14. Each of the piers, in turn, is adapted to be mounted on a rigidly supported base plate 16. As a practical matter, any suitable means may be employed in affixing the piers 14 to the base plate 16, however, threaded screws 18 serve quite satisfactorily for this purpose.

Midway between the piers 14 there is disposed a mounting block 20 which, as a practical matter, may comprise a bearing block for the gyro motor 12. The mounting block 20 is interconnected with the piers 14 through a plurality of mutually spaced flexure plates 22 arranged in parallelism and interconnected through a plurality of flexure pins designated 24.

Figure 4:
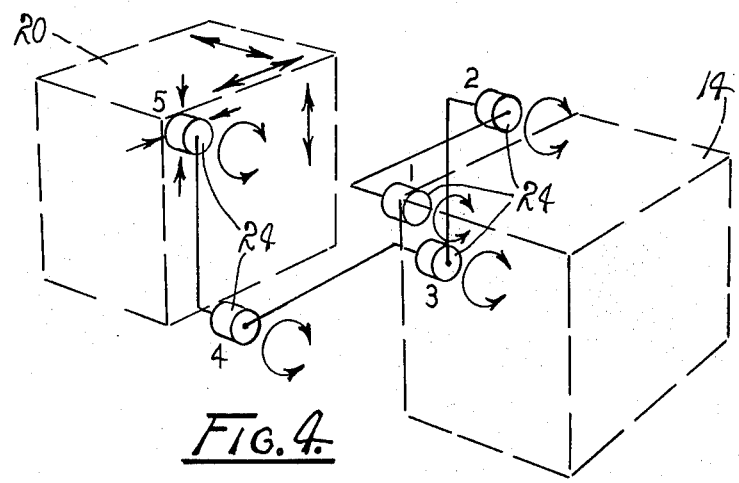
FIG. 4 is a diagrammatic view illustrating axes of flexure for the flexure pins employed in interconnecting the flexure plates.

It is important to note, as illustrated in FIG. 4, that in order to uniformly distribute stress throughout the hangers 10 the flexure pins 24 are disposed 90° apart about an imaginary helix concentrically related to an axis extended between one of the piers 14 and the mounting block 20. For illustrative purposes, the sequential positioning of the flexure pins 24 is designated by numerals 1 through 5. It will, upon a review of the drawings, be appreciated that the pins are sequentially disposed in abaxial alignment with the longitudinal axis thereof being arranged in mutual parallelism.

It is to be understood that the plates 22 may be of circular or rectangular, or other suitable configurations and that the flexure pins 24 are formed from suitable elastic stock material, including metals as well as synthetic resins, dictated by the intended use of the hangers 10. Moreover, the pins are so fabricated as to possess a substantially common coefficient of resiliency, whereby the pins tend to exhibit a substantially common resistance to torque, as well as to bending, within their elastic limits. Consequently, it should be appreciated that each of the flexure pins 24 has an axis of flexure coincident with its longitudinal axis about which torsion induced motion is accommodated, as well as an axis of flexure intersecting its longitudinal axis. Each of the flexure pins 24 is, in turn, connected at its opposite ends with one of the flexure plates 22 in any suitable manner, such as by welding or the like. Suitable adhesives compatible with the material from which the plates 22 and pins 24 are fabricated may be employed for this purpose, where so desired.

As a practical matter, the hanger 10 may be machined from an integral piece of stock material or, where practical, formed through known injection molding processes.

In practice, the flexure plates 22 are of a similar design and possess a substantially common coefficient of resiliency so that the plates uniformly exhibit a substantially common resistance to deflection about similarly oriented axes of deflection. For purposes of understanding this invention, it may be assumed that these axes lie in the planes of symmetry of the flexure plates 22.

Upon a review of the drawings, it will be appreciated that the flexure pins 24 are connected with the flexure plates 22 in a paired relationship so that from each of the plates there is oppositely extended a pair of flexure pins 24, spaced 90° apart about an axis normally related to the plane of the plate. Of course, should adjacent flexure pins 24 be placed in compression, or tension, the interposed plate is subjected to stress, about an axis normally related to a line connecting the longitudinal axes of the pins. Consequently, alternately disposed flexure plates 22 include an axis of flexure lying in a first common plane, while the remaining flexure plates 22 have axes of flexure lying in a second common plane normally related to the first mentioned common plane. It should, therefore, be appreciated that adjacently related flexure plates 22 exhibit similar resistance to deflection, within their elastic limits, about normally related axes so that, in effect, pairs of adjacent plates exhibit uniform resistance to motion in directions paralleling the longitudinal axis of symmetry of the hanger 10, and that motion inducing force is uniformly distributed throughout the hanger through the flexure pins 24.

The flexure pins, of course, also exhibit uniform resistance to torque, within their elastic limits, as motion transversely related to the longitudinal axis of symmetry is experienced by the mounting block 20. Hence, it should be apparent that each of the mounting blocks 20, as shown in FIG. 1, is afforded motion in at least six directions, and that resistance to motion collectively offered by the plates 22 and pins 24, in directions extending in normally related planes intersecting along the longitudinal axis of the hanger is equal, while resistance to motion offered by the plates and pins in directions paralleling the longitudinal axes of the hangers 10 is equal.

OPERATION

It is believed that in view of the foregoing description, the operation of the device will readily be understood and it will be briefly reviewed at this point.

Operation of the hanger 10 can best be illustrated with reference again being made to FIG. 1. As shown, the gyro motor 12 is supported by the pair of hangers 10 through the use of an axle, not shown, extended between and secured to the mounting blocks 20. Motion of the blocks 20 along paths lying in a pair of normally related planes intersecting along the longitudinal axes of the hangers 10, resulting from temperature change, thrust pressure, gyro precession, or the like, is resisted by the combined rigidity of the flexure plates 22 and flexure pins 24, within their elastic limits. Consequently, the hangers 10 serve to accommodate motion in these four directions resisted by forces of a common magnitude. However, motion, in opposite directions, paralleling the longitudinal axes of the hangers 10 is resisted via the flexure plates 22 interconnected through the flexure pins 24 with forces of a common magnitude. Of course, when the mounting blocks 20 are displaced along paths paralleling the longitudinal axes of symmetry for the hangers 10, one-half of the flexure pins 24 act in compression while the other half of the pins act in tension and the flexure plates 22 are subjected to stress about alternate, normally related axes of flexure.

In view of the foregoing, it should be apparent that the hangers 10 which embody the principles of the instant invention are characterized by substantial uniformity in directional rigidity and thus provide a practical solution to the perplexing problem of providing lightweight, economic and practical hangers characterized by a high degree of reliability, for mounting delicate instrumentation, such as gyro motors and the like, in environments wherein the instrumentation is subjected to substantial vibration and extensive G-loading, as typified by conditions attending the launching of spacecraft and similar vehicles.

Although the invention has been herein shown and described in what is conceived to be the most practical and preferred embodiment, it is recognized that departures may be made therefrom within the scope of the invention, which is not to be limited to the illustrative details disclosed.

We claim:

1. A mounting for resiliently supporting a delicate instrumentation unit comprising;
    a pair of spaced parallel elongated elastic bodies with each of said bodies having a central longitudinal axis and with each having the ends thereof joined to rigidly supported piers;
    each of said elongated bodies comprising a mounting block and a plurality of adjacent mutually spaced parallel flexure plates extending from two opposite sides of said mounting block;

means for uniting said flexure plates, said mounting block and said piers of each of said elongated bodies comprising a flexure pin connected to and extending between said adjacent plates, between a plate and each of said piers and between said mounting block and each plate adjacent said mounting block at opposite sides thereof;

said flexure pins between adjacent plates being abaxially aligned about said central longitudinal axis of each of said elongated bodies and being sequentially spaced apart in helical progression by 90°;

an instrumentation unit having a rotating component, said unit being mounted between said spaced elongated bodies and being attached to said mounting blocks;

each of said flexure pins having a central longitudinal axis about which said pin is symmetrical whereby the resistance to flexure of each of said pins is equal in all directions.

* * * * *